UNITED STATES PATENT OFFICE 2,578,428

PROCESS OF PRODUCING COPOLYMERS BY REACTING AN N-CARBOXYL ANHYDRIDE OF AN ALPHA AMINO ACID WITH AN OMEGA AMINO ACID

Efraim Kaczalski, Brooklyn, N. Y., assignor to Joseph Blumenfeld, New York, N. Y.

No Drawing. Application April 17, 1948,
Serial No. 21,747

3 Claims. (Cl. 260—77.5)

This invention relates to novel linear copolymers of the polyamide type.

The self-polymerization of amino acids, e. g., ε-aminocaproic acid and the polymerization of dicarboxylic acids, such as adipic acid with diamines, such as hexamethylene diamine, results in chemically inert linear polymers which cannot readily be converted to or produced in the form of an ester, salt, or other compound for which there is a great industrial and consumer demand.

It is among the objects of this invention to provide a linear copolymer of the polyamide type and processes of preparing the same with or without acid, ester, amino or other desired substituents and therefore of corresponding versatility in industrial application.

Other objects and advantages of this invention will be apparent from the following detailed description thereof.

I have made the surprising discovery that α-amino acids, preferably their N-carboxyl anhydride derivatives may be copolymerized with an amino acid having at least 5 carbon atoms in a linear chain between the amino group and the carboxyl group to produce copolymers of great industrial utility.

Any α-amino acid or mixture of such acids may be employed as one of the starting reactants. These acids have the general formula

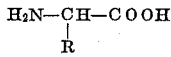

in which R is any radical including, for example, alkyl, aryl, arylalkyl, amino, guanidino, ester, or a carboxyl group. Examples of such amino acids are glycine, alanine, leucine, norleucine, phenylalanine, tyrosine, diiodotyrosine, thyroxine, tryptophane, aspartic acid, glutamic acid, arginine and lysine. Preferably, the α-amino acid is not employed as such in carrying out the reaction, but in the form of its N-carboxyl anhydride having the general formula

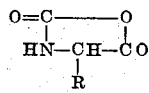

As the other reactant an amino acid or derivative thereof in which the amino group is linked to the carboxyl group by at least 5 carbon atoms is used. A mixture of such acids or derivatives thereof may be used, if desired. It is important that the chain linking the amino group and the carboxyl group have at least 5 carbon atoms in a linear chain, because otherwise there is tendency for intramolecular reaction to take place between the amino and carboxyl groups resulting in the non-formation of the desired copolymer. These amino acids have the general formula $$H_2N \cdot C \cdot C \cdot C \cdot C \cdot C \cdots COOH$$

the number of carbon atoms between the amino and carboxyl groups being 5 or more. Saturated amino acids having the general formula $$H_2N(CH_2)_xCOOH$$

in which X is equal to 5 or more may be used. Examples of amino acids coming within the scope of this invention are 11-amino undecanoic or undecylic acid, 10-amino decanoic or decylic acid and the amino acids of other fatty acids containing six or more carbon atoms.

In carrying out the copolymerization the α-amino acid desirably in the form of its N-carboxyl anhydride is mixed with the other amino acid at a temperature preferably just above that of the higher softening or melting point of the two reactants, so that both reactants are in the liquid phase. The reaction takes place while the reactants are maintained at such temperature for a sufficient period of time to produce a copolymer having the desired molecular weight and other properties. Higher temperatures may be used, but in general such higher temperatures tend to cause decomposition particularly of the α-amino acid and should therefore be avoided. The reaction may be carried out under atmospheric sub or superatmospheric pressure conditions. The proportions in which the reactants are mixed will vary depending on the desired properties of the copolymer and they are heated to a temperature such that the reactants are liquid, for example, they may be heated to a temperature of from 120° to 250° C. in an oil bath for a period of time sufficient to cause the reaction to take place, usually for 1 to 2 hours. The end of the reaction is indicated by cessation of carbon dioxide and water vapor evolution.

When carrying out the preferred reaction the amino acid $NH_2(CH_2)_xCOOH$ combines with the N-carboxyl anhydride of the α-amino acid, water vapor and carbon dioxide are evolved, the residue of the amino acid combines with the residue of the α-amino acid and a polyamide is formed of the general formula:

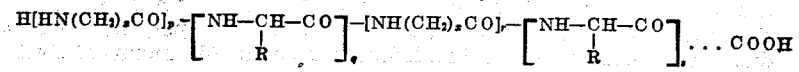

in which $p$, $q$, $r$, $s$, etc. are integers which may be the same or different. The character of the substituent corresponding to R, I have found, does not affect the reaction, and hence R can be any desired radical or group, e. g., carboxyl, ester, salt, alkyl, aryl, arylalkyl, amino, etc. In this way polyamide copolymers are produced having in their side chains groups which impart acidic, basic, aliphatic, aromatic, etc. properties to the copolymer.

By polymerizing, for example, 11-amino undecylic acid and glycine and a copolymer of melting point higher than that of the polymer of 11-amino undecylic acid is formed which copolymer produces fibres of increased strength as compared, for example, with nylon type fibres. On the other hand by copolymerizing α-amino acids having long side chains, for example, leucine, with an amino acid containing at least 5 carbon atoms separating the amino and carboxyl groups, a relatively low melting linear copolymer of the polyamide type is produced suitable for use as a plasticizer. A wide variety of copolymers may be produced the properties of which will depend upon the particular starting monomers and the conditions under which the copolymerization is carried out, namely, the proportions in which the reactants are mixed and the temperature and time of polymerization. The copolymers produced may readily be drawn to produce fibres for textile and other manufactures, may be used in the plastics art, e. g., may be molded or extruded into desirable products, may be used as ion exchangers, plasticizers and have many other industrial uses. In general the copolymers produced have molecular weights in excess of 3000, preferably within the range of from 5000 to 50,000 and even higher.

The following examples are given for purposes of illustration only. It will be understood this invention is not limited to these examples.

Example I 100 parts of 11-amino undecylic acid were mixed with 80 parts ε-carbobenzoxy-α-carboxyl lysine anhydride. The carbobenzoxy derivative was used because it protects the ε-amino group of lysine during the course of reaction and may be removed easily from the copolymer by reduction with phosphonium iodide. The mixture was melted in an oil bath and kept at 210° C. for an hour. Water vapor and carbon dioxide were evolved and the yellowish clear mixture turned into a homogeneous viscous mass which solidified on cooling.

The copolymer thus produced was purified by dissolving in benzyl alcohol and precipitating with methanol.

50 parts of the copolymer were dispersed in 200 parts of glacial acetic acid and a stream of hydrogen bubbled through the dispersion. The mixture was kept at 50° C. 100 parts of phosphonium iodide were added in three successive portions of 50 parts each and the reduction continued for 2 hours. A semi-solid separated out, the supernatant fluid was decanted and the residue washed with water until no iodine ions could be detected in the washings. The resultant copolymer was soluble in glacial acetic acid and insoluble in water. It had a melting point of 160° C.

The following data demonstrates that a copolymer was in fact produced and not a mixture of polyamino undecylic acid and poly-lysine. It is well known that poly-lysine is soluble in water, while polyamino undecylic acid is insoluble in water. Hence, a copolymer of lysine and 11-amino undecylic acid would be slightly soluble in water as it contains only a small amount of free amino groups and should yield on hydrolysis free lysine. The copolymer was found to be slightly soluble in water, to contain about 1% free amino groups (determined by Van Slykes manometric method) and to yield on hydrolysis the expected percentage of lysine, namely, about 10%. The washings gave a negative biuret reaction indicating no poly-lysine was present. The above data establishes that the material subjected to test was in fact a copolymer.

Example II 33 parts of N-carboxyl phenylalanine anhydride were mixed with 67 parts of 11-amino undecanoic acid and the mixture heated for 1 hour at 200° C. A transparent liquid was initially obtained which became more and more viscous as the liberation of carbon dioxide and water vapor took place, finally resulting in a solid copolymer having the following general formula

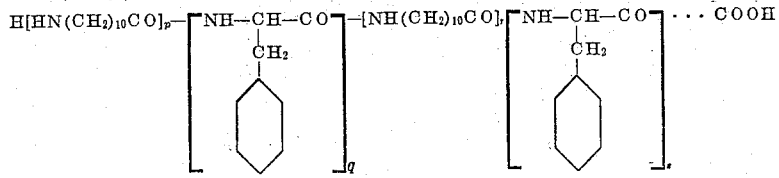

in which $p$, $q$, $r$, $s$, etc. are integers which may be the same or different. This copolymer was purified by dissolving in sulfuric acid and precipitating with water. It had a melting point of about 160° C.

The solubility of the copolymer in hot sulfuric acid establishes that it is in fact a copolymer and not a mixture of polyphenylalanine and polyamino undecanoic acid. Polyphenylalanine is readily soluble in sulfuric acid, whereas polyamino undecanoic acid is not soluble in sulfuric acid. Hence, the treatment of a mixture of polyphenylalanine and polyamino undecanoic acid with sulfuric acid should dissolve the polyphenylalanine while the polyamino undecanoic acid remains undissolved. It was found that the total copolymer produced in this example dissolved in hot sulfuric acid. This may be attributed to the aromatic groups of the copolymer which tend to make the whole molecule soluble in sulfuric acid.

Example III 100 parts of 11-amino undecanoic acid were mixed with 10 parts N-carboxyl-glycerine anhydride. The mixture was melted in an oil bath and kept at 220° C. for an hour. Water vapor and carbon dioxide were evolved and the mixture turned into a homogeneous viscous mass which solidified on cooling. The softening point of the resultant copolymer was about 190°–200° C. The copolymer was purified by dissolving in hot benzyl alcohol and precipitated by methanol. The copolymer yields on acid hydrolysis the expected amount of glycine and 11-amino undecanoic acid.

This fact and the relatively high melting point establish the formation of a copolymer.

It will be noted this invention provides a novel linear polyamide copolymer which depending upon the nature of the α-amino acid or derivative thereof copolymerized with an amino acid containing at least 5 carbon atoms between the amino and carboxyl groups may have any desired substituent and is therefore of wide industrial utility.

As many changes could be made in the above product and process, and many apparently widely different embodiments of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. The process which comprises mixing an N-carboxyl anhydride having the formula

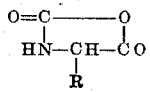

in which R is selected from the group consisting of hydrogen and a radical which remains inert during the copolymerizing reaction with an amino acid having the formula $H_2N(CH_2)_xCOOH$ in which X is equal to at least 5, maintaining the mixture at a temperature just above the melting point of the higher melting of the two reactants until a copolymer is produced and isolating the copolymer.

2. The process which comprises heating a mixture of 11-amino undecylic acid with ε-carbobenzoxy α-carboxyl lysine anhydride at a temperature of about 210° C. for a period of time to form a copolymer of ε-carbobenzoxy lysine and 11-amino undecylic acid and isolating the copolymer thus produced.

3. A process as defined in claim 2, in which the copolymer of ε-carbobenzoxy lysine and 11-amino undecylic acid is reduced with phosphonium iodide at a temperature of about 50° C. in glacial acetic acid and in a hydrogen atmosphere.

EFRAIM KACZALSKI.

REFERENCES CITED

The following references are of record in the file of this patent:

UNITED STATES PATENTS

| Number | Name | Date |
|---|---|---|
| 2,071,253 | Carothers | Feb. 16, 1937 |
| 2,356,516 | Hagedorn | Aug. 22, 1944 |

OTHER REFERENCES

Wessely et al.: Zeitschrift für Physiologische Chemie, vol. 159, pp. 102–119 (1926).

Katchalski et al.: Jour. Am. Chem. Soc., October 1947, vol. 69, pp. 2564–5.

Woodward et al.: Jour. Am. Chem. Soc., June 1947, vol. 69, pp. 1551–2.

Sigmund et al.: Hoppe-Seyler Zeitschrift für Physiologische Chemie, vol. 157, 1926, pp. 91 to 96, 99 to 100.